March 14, 1967 W. P. BOLLINGER ETAL 3,309,701
SIMULTANEOUS LOBING RADAR
Filed Nov. 30, 1950 2 Sheets-Sheet 2
*Fig_2*
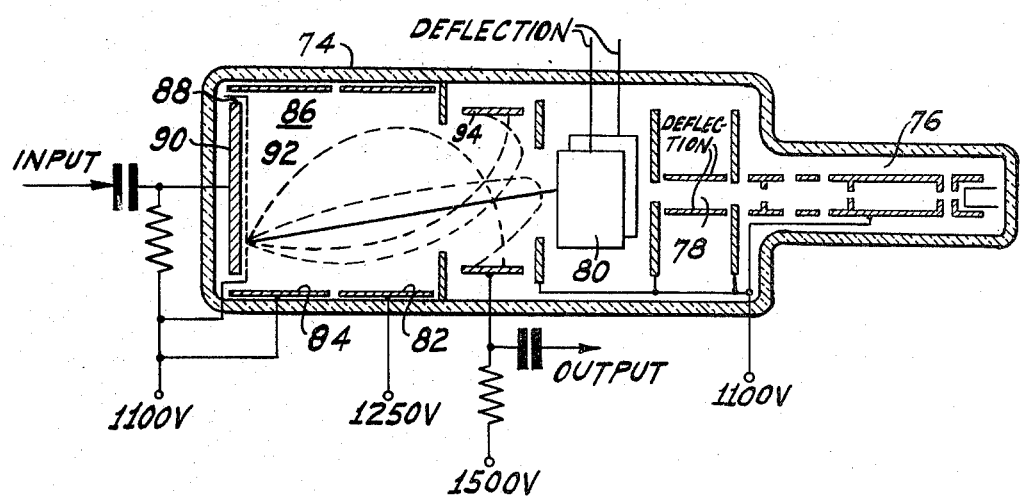
INVENTORS
*Waldon Pearson Bollinger,*
*and John R. Ford*
BY
ATTORNEY

United States Patent Office 3,309,701
Patented Mar. 14, 1967

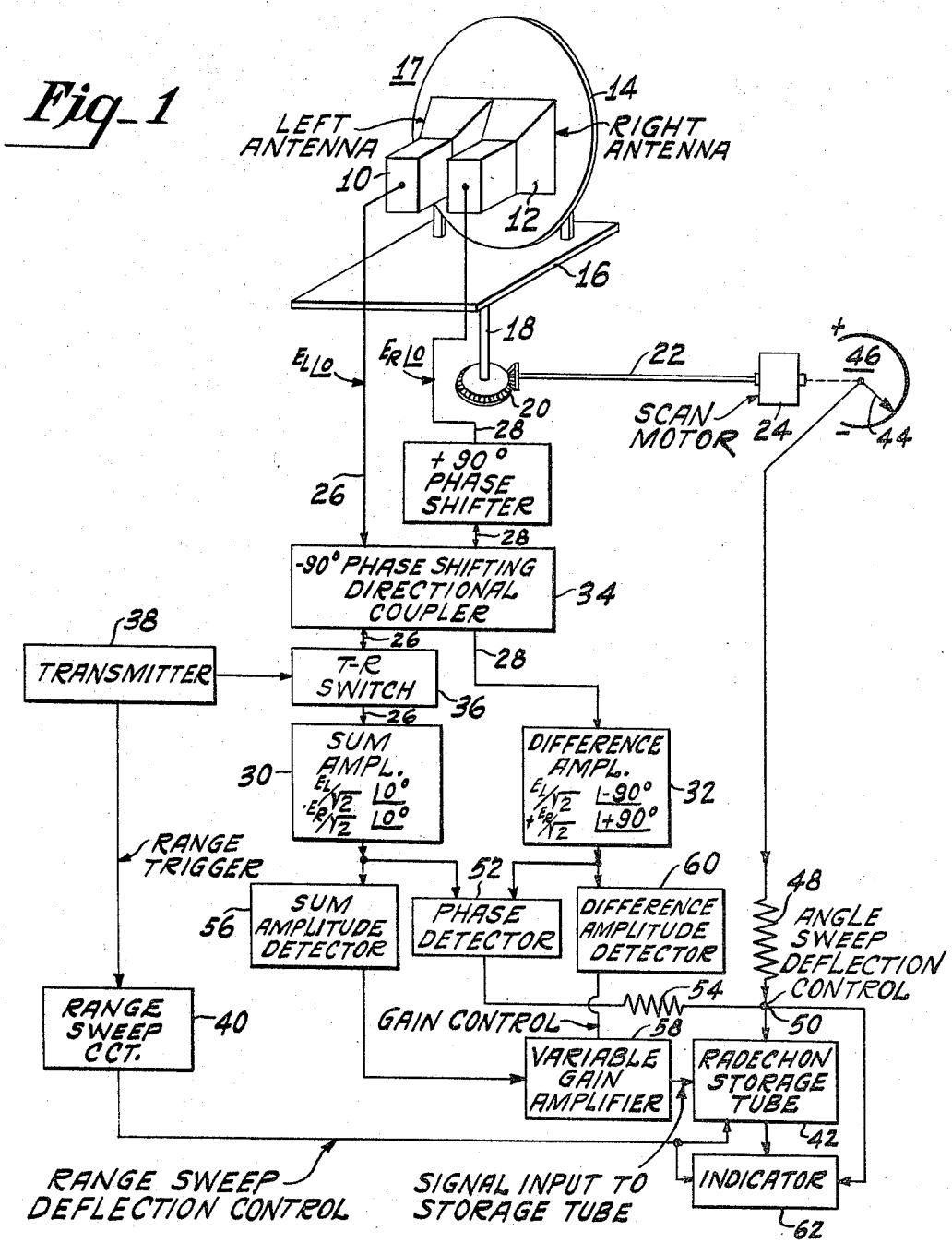

3,309,701
SIMULTANEOUS LOBING RADAR
Waldon Pearson Bollinger, Haddonfield, N.J., and John R. Ford, Narberth, Pa., assignors, by mesne assignments, to the United States of America as represented by the Secretary of the Army
Filed Nov. 30, 1950, Ser. No. 198,272
13 Claims. (Cl. 343—11)

The present invention relates to radar (radio echo detection and ranging) systems and more particularly to radar systems of the simultaneously lobing type.

In a simultaneous lobing radar set, two receiving antennas are used having substantially identical directive energy patterns displaced a fraction of the width of the pattern, so that the patterns overlap with the directive axes thereof side by side. These antennas each receive the echo signals from a target. The signals are fed to circuits which give simultaneously "sum" and "difference" outputs respectively proportional to the vector sum and the vector difference of the received echo signals. The desired directive energy patterns may be derived by using two directive receiver elements, such as electromagnetic horns with a common focusing device, such as a lens or parabolic reflector. The receiver elements are positioned on opposite sides of the optical axis of the focusing device near the focal point. Alternatively, two completely independent antennas may be employed the directive patterns of which are suitably offset. The difference signals provide a means of determination of the sensing of the direction of the received signal with respect to an axial line from the antennas. Simultaneous lobing radar systems are also known which utilize four radiation patterns providing both up-down and right-left sensing. There may thus be provided, if desired, sensing for all the angular directions of interest. Scanning may be accomplished by rotating the overall antenna system. MTI (moving target indicator) radar systems discriminate in favor of moving objects echoing the transmitted radar signals and discriminate against objects which are fixed or against general background clutter.

It is an object of the present invention to improve MTI radar and its operation.

It is a further object of the invention to improve the characteristics of MTI radar.

A still further object of the invention is to secure MTI operation with a simultaneously lobing radar system.

Another object of the invention is to operate an MTI radar system with high sensitivity to moving echoing objects or targets to be detected, with high resolution.

Another object of the invention is to minimize false indications in MTI radar operation and especially those due to the scanning action of the antenna.

In accordance with the invention, an MTI radar system is provided employing the peculiar characteristics of a simultaneous lobing radar system. An improved MTI operation is thereby secured. According to one important feature of the invention, the signal derived from the sum receiver of a simultaneous lobing radar system, by control of its amplification in response to a signal derived from the difference signal, is compensated for angular departure of the central axis of the antenna energy patterns from the echoing object. According to another important feature, the amplified signal is stored on a storage tube target with the point of storage along the angle reading dimension corrected by a signal having sensing and derived from the difference signal, thus compensating for angular departure of the said central axis from the echoing object. By the combination of these features, the stored signal is fixed in both amplitude and position on the storage tube target, so long and only so long as the echoing object remains fixed with respect to the antennas; by the internal cancellation or subtraction of successive signals the storage tube output is substantially zero or nil for such stored signals. Movement of the echoing object changes one or both of the amplitude or position of the stored signal on the storage tube target, resulting in an output signal from the storage tube, which may be used in indicate moving objects (targets) to the exclusion of fixed objects and clutter. Th compensating signals thus applied, in accordance with the invention, results in improved MTI operation.

In the preferred embodiment of the invention, illustrated herein, the sum signal from the transmission lines of the simultaneous lobing radar is demodulated and supplied to a variable gain amplifier. The difference signals are detected by a phase detector the output of which has sensing. The phase detector output is combined with a voltage proportional to the antenna angle to provide an angle sweep deflection control voltage which is proportional to the angle of scan of the antennas, corrected for the angle or the angular departure between the central axis of the antennas' pattern and the echoing object location. Thus this angle sweep control voltage remains substantially constant so long and only so long as the target or object under observation remains fixed in angle. It is applied as the angle sweep control voltage of a storage tube. The detected amplitude of the sum signal is supplied to a variable gain amplifier the gain of which is controlled in accordance with the amplitude of the difference signals. The output of the variable gain amplifier is then employed as the signal to be stored in the storage tube.

By operating the storage tube with the modified deflection control voltage (the angle sweep control voltage mentioned above) the storage tube electron beam may be made successively to sweep over the same line as long as signals are being received from any particular fixed target. Because of this deflection control, differencing signals representative of a change of position of the target taken from the output oft he storage tube then tend to be more limited to actually moving targets and also give moving target indications with a high degree of angular resolution. Even targets or objects moving only angularly and not radially with respect to the antenna mount are detected. Because the input to the storage tube beam current control is arranged as described, undersired modulation due to the antenna scanning motion is suppressed or considerably diminished.

The foregoig and other objects, advantages, and novel features of the invention will be more apparent from the following description when taken in connection with the accompanying drawing in which:

FIG. 1 is a schematic diagram largely in block form illustrating an embodiment of the invention; and FIG. 2 is a longitudinal cross section schematically illustrating a suitable storage tube which may be employed in the embodiment of FIG. 1.

Referring now more particularly to FIG. 1, a pair of receiving horns 10, 12 are positioned side by side with the centers of their mouths as close together as possible and arranged to radiate or receive energy in a substantially horizontal plane. A dielectric lens element 14 common to both horns 10, 12 is mounted with its optical axis in alignment with the central axis between (bisecting) the axis of the energy patterns of the horns to bring energy substantially to a focus at or near the horn mouths. The optical axis of the lens 14 preferably lies substantially horizontally in the principal direction of radiation from the horn antennas and centrally between them. Horn 10 with lens 14 is for convenience designated the Left Antenna and horn 12 with lens 14 is designated the Right Antenna. The horns 10, 12 and lens 14 are mounted on a suitable base 16 to provide an assembly 17 which is rotated in a horizontal plane by a shaft 18.

The shaft 18 is geared by gearing 20 to the shaft 22 of a scan motor 24. There is thus provided a common scan drive for the right and left antennas. The horns 10, 12 are connected respectively to transmission lines (termed for convenience right and left respectively) 26, 28, which are merely indicated by lines but in a typical physical embodiment might be waveguides. The left transmission line 26 is connected to a sum amplifier 30 and the right transmission line 28 is connected to a difference amplifier 32. Transmission lines 26, 28 are coupled to each other by a phase shifting directional coupler 34 which transfers substantially one-half the energy from one transmission line to the other with a 90° phase shift. The phase shifting directional coupler, if the transmission lines are rectangular waveguides, may be a long slot in a common wall portion between the two waveguides adjusted in length to transfer substantially one-half the energy at the operating frequency from one waveguide to the other. Such long slot couplers are always characterized by a 90° phase shift which is plus or minus depending on whether the slot is in a common broad wall portion or a common narrow wall portion of the two waveguides. Such a long slot coupling is disclosed, for example, in the copending application of Waldon P. Bollinger, Ser. No. 73,838, filed Jan. 3, 1949, now abandoned. Other waveguides and other transmission line circuits are known for interconnecting transmission lines providing a directional coupler coupling and may be arranged to transfer half the energy with the desired phase shift. One of the transmission lines, for example right line 28, is a quarter wavelength longer at the operating rfequency than the other transmission line from their respective points of coupling to the horns 10, 12 to their effective point of coupling between each other by the directional coupler. A TR (transmit-receive) switch is interposed in the left line 26 between the directional coupler arrangement 34 and the sum amplifier 30. A transmitter 38 is connected to the TR switch 36. The TR switch 36 is a well-known device which may be interposed in the left line 26 so that transmitted energy passes along the left line 26 toward the antennas and is blocked from passage in the direction of the sum amplifier 30, whereas received signals passing down the left transmission line 26 toward the TR switch 36 are blocked from the transmitter 38 and travel toward the sum amplifier 30. The radar set illustrated is a pulse transmission type and the trigger voltage from the transmitter 38 which initiates transmission at the pulse repetition rate is supplied by a suitable connection to a range sweep circuit 40. The range sweep circuit 40 provides a sweep voltage or range sweep deflection control through a suitable connection to a radechon storage tube 42 and controls the sweep of the electron beam of the storage tube along one dimension across the target of the storage tube. The range sweep circuit may be any one of several well-known forms. The scan motor 24 is mechanically connected to the arm 44 of a potentiometer 46 across which is impressed a suitable potential. The arm 44 is electrically connected through a resistor 48 to a junction 50. Voltage from the junction 50 is connected to the radechon storage tube 42 to control the sweep of the electron beam of the storage tube across the target thereof in a direction transverse to that of the range sweep. A phase detector 52 receives the signals amplified by the sum amplifier 30 and the difference amplifier 32. This phase detector provides a direct current voltage having sensing (plus or minus) in accordance with whether the difference amplifier voltage from difference amplifier 32 is plus or minus 90° out of phase with the voltage from the sum amplifier. Such phase detector circuits are known. See for example Section 3.12 beginning at page 111 of volume 25 of the Radiation Laboratory Series entitled, Theory of Servo Mechanisms, edited by James, Nicholes, and Phillips. The output derived by the phase detector 52 is supplied through a resistor 54 to the junction 50. The output from the phase detector 52 is thus combined with the output from the potentiometer arm 44 to control the angle sweep deflection, to compensate or correct the angle deflection for the angle between the central axis of the antenna pattern and the object location. A sum amplitude detector 56 is connected to receive the sum signals from sum amplifier 30. The sum detector 56 has an output proportional to the amplitude of the sum signals which output is supplied to a variable gain amplifier 58. A difference amplitude detector 60 is connected to the difference amplifier 32 to provide an output which is proportional to the amplitude of the difference signals. The output from difference amplitude detector 60 is connected to the variable gain amplifier 58 to control the gain thereof. However, from what follows hereinafter, it will be apparent that, if the sum amplifier 30 or sum amplitude detector 56 have a variable gain characteristic, the gain of any one or more of sum amplifier 30, sum amplitude detector 56, or amplifier 58 may be controlled by the output from difference amplitude detector 60. The connection shown is that presently preferred. The point is to control by suitable means the amplification of the output signal from the final amplifier by the amplitude of the difference signal. The output of the sum amplitude detector 56 after amplification in the variable gain amplifier 58 is applied to the input signal electrode of the storage tube 42 to control the stored signal. The stored signal is thus corrected for its displacement from the maximum return point in the antenna beam patterns by virtue of the gain control of the amplifier. The same sweep deflection control voltages which are applied to the radechon storage tube 42 may be applied to an indicator 62 which receives the output of the storage tube and may be an indicator of the cathode ray tube intensity modulated type with a fluorescent screen for displaying visually the output of the radechon storage tube 42. A suitable type of sweep for both tubes is the so-called "B" sweep. The beam is swept along one dimension or axis a distance proportional to time after transmission of each pulse, and deflected along another axis preferably normal to the first a distance proportional to the angle. However, it is obvious that other types of sweeps may be used.

Referring now more particularly to FIG. 2, there is illustrated a radechon storage tube of the type which may be employed in the invention. For a further description of this tube reference may be had to the article entitled, "Barrier Grid Storage Tube and Its Operation," by A. S. Jensen, J. P. Smith, M. S. Mesner, and L. E. Flory published in the RCA Review, for March, 1948, volume IX, No. 1 starting at page 112. Referring more particularly to FIG. 2, preferably the tube comprises an envelope 74, an electron gun 76 to produce a beam of electrons 77 within the tube, sets of deflecting plates 78 and 80 and focusing electrodes 82 and 84 which may be wall coatings on the wall of the envelope 74. A target 86 is provided of a plate of mica 88 having a metallic backing or electrode 90 to which the input signal is applied. The target is also provided with a barrier grid 92 immediately in front of and closely adjacent to the mica plate 88. A collector 94 also acts as the output electrode and collects electrons returning from the direction of the target 92. Typical operating voltages are shown in FIG. 2. In operation, a signal applied to the input electrode 90 with the electron beam at some particular point of the target 86 is there stored. At a later time if no signal is applied when the electron beam again strikes this point, the signal is removed or read and simultaneously withdrawn and appears on the output electrode 94. Differences in signals are also read. The last signal is stored, and the difference between that and the preceding signal appears at the output when properly operated. Thus, in the particular tube chosen for use with this embodiment of the invention, the same electron beam acts both as a writing and reading beam. The usual common ground connection between the various circuits of FIG. 1 and the direct current voltage supply have generally been omitted from the drawing. Notwithstanding, the manner in which the connections are made and in which the storage tube is inserted in circuit will be readily understood by those familiar with such matters.

In operation, the transmitter transmits pulses of high frequency energy at the operating frequency, the pulses being repeated at intervals at the pulse repetition frequency energy at the operating frequency, the pulses being repeated at intervals at the pulse repetition frequency. Assuming that the transmitter transmits one such pulse, it is fed through the TR switch 36 to travel down the line 26 toward the antenna 10. Half of the energy is coupled by the directional coupler 24 to line 28 with a minus 90° phase shift. However, the energy in line 28 in its travel to antenna 12 is shifted plus 90° in phase either because the line 28 is longer as described or because some other equivalent phase shifting means are employed and the line is electrically longer than the line 26. Thus the energy supplied from line 26 to horn 10 and the left antenna and the energy supplied from line 28 to horn 12 and the right antenna leaves the antennas in phase. Because the energy is in phase and because the directive axes of the antennas 10, 12 are parallel to each other, the energy will travel outwardly substantially along the optical axis of lens 14 and is focused by the lens 14 to travel in substantially parallel paths or paths only slightly angularly separated. Meanwhile, of course, the antenna scan motor 24 is turning assembly 17. For simplicity, it may be assumed that the entire set is mounted for rotation, except the indicator and a D.C. supply for it, the other voltages being fed to it by suitable slip rings or the like (not shown). In practice, it is understood that a convenient portion of the apparatus is mounted for rotation with the antenna system, and the remainder fixed in a suitable housing, with interconnections between the rotating and stationary parts being made through appropriate slip rings or rotating joints or the like. The length of the pulse in time is presumed to be quite short compared with the rotation of the antenna so that during transmission of any single pulse, the antennas are at a substantially fixed and certain scan angle. In order to be specific it may be assumed by way of example that fifteen such pulses of high frequency energy of, say five microseconds' duration, are emitted from the horns, 10, 12 during 3° of rotation of the antenna scan assembly in a period of ⅟₁₀ second, the assembly rotating at a rate of once each 12 seconds. If there is an echoing object in the beam of transmitted energy, a portion of the energy is echoed and received again at the horn 10, 12 after passage through the lens 14. Assume that such reflected energy reaching the left antenna causes a voltage $E_L\angle 0$ at horn 10 and that at the right antenna causes a voltage $E_R\angle 0$ at the antenna horn 12 where the horns connect to lines 26 and 28 respectively. Only the relative phase relations between the returned signals will be considered at the moment. The amount by which the signals are shifted in phase by reason of travel through the transmission lines 26, 28 is immaterial, but the difference between these phase shifts is material. Accordingly, considering now the energy derived from the left antenna as the reference voltage, then the voltage arriving at sum amplifier 30 from the left-hand antenna is $E_L/2\angle 0°$. The energy from the left-hand antenna which passes to the difference amplifier 32 is characterized by voltage $E_L/2\angle -90°$. The 90° phase shift with respect to the voltage reaching the sum amplifier is due to the passage through the phase shift directional coupler 34. The energy from the right antenna reaches the sum amplifier 30 with a voltage $E_R 2\angle 0°$ because of the plus and minus 90° phase shifts due respectively to the longer electrical line length of right line 28 and the coupler arrangement 34. The voltage from the right antenna reaching the difference amplifier 32 is $E_R/2\angle +90°$ because of the extra electrical line length of right line 28. It is assumed, of course, that the effective electrical distance between the phase shifting directional coupler 34 and the sum amplifier 30 through the transmission line 26 is equal to that from the phase shifting directional coupler 34 through the line 28 to the difference amplifier 32, notwithstanding the TR switch 36. It is therefore apparent that the voltage at the sum amplifier 30 is the sum of the voltages arriving from left and right antennas 10, 12 because these voltages arrive in phase with each other. On the other hand, the voltage arriving at the difference amplifier 32 having their origins at the left and right antennas arrive at the difference amplifier 32 respectively in and out of phase. Therefore, the total voltage at the sum amplifier is $2E_R$ and the total voltage at the difference amplifier is 0, assuming the initial amplitudes $E_R$ and $E_L$ to be equal. The conservation of energy is preserved, and all of the energy is usefully employed. Assume, however, that there is a difference between the voltage amplitude arriving at the right and left antennas 10, 12. Such differences will be caused by an echo from an echoing object being off the optical axis of the lens 14 at the moment of reflection. In this event, there will be a net difference between the voltages arriving at the difference amplifier 32, the phase thereof depending on which voltage, $E_R$ or $E_L$ predominates. The phase detector 52 is any well-known type of phase detector which, in effect, using the sum amplifier voltage as a reference voltage compares the difference amplifier output with the sum amplifier output and determines which 90° component (the +90° or −90° component) in the difference amplifier exceeds the other and by what amount. In effect, the output of the phase detector gives a sensing voltage which is plus or minus in accordance with which voltage from the right or left antenna is in excess of the other. Furthermore, this output voltage from the phase detector at least to a first order of magnitude is substantially proportional to the energy received at one antenna over that received at the other. The difference amplitude detector 60 produces a voltage which is similarly proportional to the excess of energy received at one antenna over that of the other but without sensing and may be an ordinary amplitude detector. The variable gain amplifier 58 receives the output of the sum amplitude detector 56 which is substantially proportional to the vector sum of the signals received at the antennas, but without sensing. The gain of the variable gain amplifier is controlled by the output from the difference amplitude detector with the gain being increased with increased output from the difference amplitude detector 60. The signal input to the storage tube 42 which is applied to the signal input electrode 90 (FIG. 2) is the signal that is stored and it is apparent that this signal now remains substantially constant in amplitude so long as echoes are received from a fixed echoing object. It may be desirable to gate the incoming signal perhaps at the sum and difference amplifier 30 and 32 or at some other suitable points so that there will be no confusing effect due to more than one echo signal being received at a time. However, such gated circuits are well known and have not been illustrated in order to simplify the disclosure herein and clarify the operating principles. Furthermore, the output of the phase detector (FIG. 1) fed through the resistor 54 is a correction voltage which is applied at the junction 50 in a manner depending upon the sense of rotation of the antenna assembly including the base 16 so that it opposes the changing of the voltage supplied from the potentiometer 46. The voltage at junction 50, however, controls the angle sweep deflection. Thus it will be seen that so long as the echoing object remains in the beam from the antenna assembly, the sweep is substantially repetitive over the same portion or line of the storage tube target. At the instant the signal from the echoing object is applied to the storage tube electron beam, the electron beam is deflected in one direction a distance proportional to the range, that is a distance depending upon the time between transmission and reception of the echo. It is deflected along a second dimension transverse to the first, a distance depending on the angular location of the object. Note that the angle sweep deflection control voltage is corrected for the discrepancy between the angular location of the echoing object and the central axis of the antenna patterns by virtue of the output of phase detector 52. The range sweep circuit 40 is conventional and preferably linear with respect to time starting with each transmitting pulse. With the system as described and the storage tube operating to give internal differencing, so long as the target remains at some fixed point with respect to the radar set while the antenna pattern is sweeping across it, the echoing pulse is stored at fixed amplitude for each pulse at the same point of the storage target both in range and azimuth. Substantially complete cancellation of fixed targets or objects to be detected is thus secured. However, if the target to be detected or echoing object moves, the storage point changes, and as the point at which the signal is stored on the storage target changes, an output signal will result which will appear on the indicator 62. No mention has been made hereinabove of signals arriving at the horns 10, 12 with phase differences. Firstly, with a focusing lens system, such as lens 14, it may be shown that off axis objects reflect signals substantially in-phase to both horns 10, 12 but with one receiving predominant signals, as long as the object remains in the antenna pattern, at least to a first order effect. This is due to the well-known optical principle that the lens causes the energy waves to converge at a point where all have travelled substantially for the same length of time. Secondly, it may be shown that without the lens 14, objects off axis in the horizontal plane send echo signals to horns 10, 12 having phase differences. By analysis similar to that for amplitude signal differences, it may be shown that because the sum and difference amplifiers receive and amplify vector sum and vector difference signals, the operation of the set disclosed is not substantially changed. The horns 10, 12 then act as right and left antennas respectively. It will be apparent that there is disclosed herein an entirely novel MTI set using novel principles of operation. Variations of signals tending to give false MTI indication due to variations of the antenna beam pattern as the antenna scans are substantially suppressed or greatly diminished, due to the fact that the variable gain amplifier controls the signal amplitude to remain substantially constant throughout the storage thereof. Similarly, the novel angle sweep deflection control circuit tends to improve the comparison of successive storages by storing the signal on the same line irrespective of apparent angular motion due to antenna motion, whereas real angular motion of the echoing object is rapidly detected because with such motion the angle sweep deflection control voltage changes the angle sweep lines.

What is claimed is:

1. In a simultaneously lobing radar system having a transmitter for transmitting signals, two antennas having energy patterns with a central axis for receiving signals echoed from an object, a common scan drive for said antennas, a pair of transmission lines one connected respectively to each antenna and interconnected to supply at a line termination of one line the vector sum of signals received by said antennas and at a line termination of the other line the vector difference of signals received by said antennas, the combination comprising a phase detector connected to said lines for detecting with sensing the difference signal amplitude and phase, a storage tube having cathode means to produce a beam of electrons, a storage target against which said beam of electrons is directed, means to withdraw the difference between successive signals from any point of the target scanned by said beam and deflection means to deflect the beam over said target, means connected to the antenna scan drive and connected also to the said phase detector to deflect said electron beam along one dimension of said target, the said deflection being thereby corrected for angular departure between said object and said antenna axis, and means to deflect said beam along a second dimension transverse to the first an amount depending upon the time between transmission and reception of a signal, said storage tube being connected to said lines through means to control the stored signal.

2. The radar system claimed in claim 1, further comprising an indicator connected to said deflection means and to said storage tube signal withdrawing means to display the withdrawn signals.

3. In a simultaneous lobing radar system having a transmitter for transmitting signals, two antennas for receiving signals echoed from an object, a common scan drive for said antennas, a sum receiver connected to said antennas to derive as output a signal proportional to the vector sum of signals from said antennas and a difference receiver connected to said antennas to derive as output a signal proportional to the vector difference of signals from said antenna, the combination comprising a variable gain amplifier connected to amplify said sum receiver output signal, means connecting said amplifier to receive said difference receiver output signal to control the gain of the amplified signal, and a utilization circuit distinct and different from said amplifier and connected to receive the said amplified signal.

4. In a simultaneous lobing radar system having a transmitter for transmitting signals, two antennas for receiving signals echoed from an object, a common scan drive for said antennas, a sum receiver connected to said antennas to derive as output a signal proportional to the vector sum of signals from said antennas and a difference receiver connected to said antennas to derive as output a signal proportional to the vector difference of signals from said antenna, the combination comprising a variable gain amplifier connected to amplify said sum receiver output and connected to have the gain of the amplified sum signal controlled by said difference receiver output, a storage tube having cathode means to produce a beam of electrons, a storage target against which said beam of electrons is directed, means to apply signals to be stored, means to withdraw the difference between successive signals as the storage tube output from any point of the target scanned by said beam, and deflection means to deflect the beam over said target, means connected to the antenna scan drive to deflect said electron beam along one dimension of said target, and means to deflect said beam along a second dimension transverse to the first an amount depending upon the time between transmission and reception of a signal, said variable gain amplifier being connected to said storage tube signal applying means with the amplified sum signal controlling the stored signal.

5. The radar system claimed in claim 4, further comprising an indicator connected to said deflection means and to said storage tube output to display the withdrawn signals.

6. In a simultaneous lobing radar system having a transmitter for transmitting signals, two antennas having energy patterns with a central axis for receiving signals echoed from an object, a pair of interconnected transmission lines connected respectively to said antennas, a common scan drive for said antennas, a sum receiver connected to one said line to derive as output a signal proportional to the vector sum of signals from said antennas and a difference receiver connected to the other said line to derive as output a signal proportional to the vector difference of signals from said antennas, the combination comprising a phase detector connected to said lines for detecting with sensing the difference signal amplitude and phase, a variable gain amplifier connected to amplify said sum receiver output and connected to have the gain of the amplified sum signal controlled by said difference receiver output, a storage tube having cathode means to produce a beam of electrons, a storage target against which said beam of electrons is directed, a signal electrode to control the signals to be stored on said target, means to withdraw the difference between successive signals from any point of the target scanned by said beam and deflection means to deflect the beam over said target, means connected to the antenna scan drive and connected to the said phase detector to deflect said electron beam along one dimension of said target, the said deflection being thereby compensated for angular departure between said object and said central axis, and means to deflect said beam along a second dimension transverse to the first an amount depending upon the time between transmission and reception of a signal, said variable gain amplifier being connected to said storage tube signal electrode to apply the stored signal in accordance with the amplifier output.

7. In a simultaneous lobing radar system having a transmitter for transmitting signals, two antennas having energy paterns with a central axis for receiving signals echoed from an object, a common scan drive for said antennas, a pair of interconnected transmission lines connected respectively to said antennas, a sum receiver connected to said lines to derive as output signal proportional to the vector sum of signals from said antennas and a difference receiver connected to said lines to drive as output a signal proportional to the vector difference of signals from said antennas, the combination comprising a phase detector connected to said lines for detecting with sensing the amplitude and phase of the difference signals, a variable gain amplifier connected to amplify said sum receiver output and connected to have the gain of the amplified sum signal controlled by said difference receiver output, a storage tube having cathode means to produce a beam of electrons, a storage target against which said beam of electrons is directed, a voltage responsive means to control the signal to be stored, means to withdraw the difference between successive signals from any point of the target scanned by said beam and deflection means to deflect the beam over said target, means connected to the antenna scan drive and connected to the said phase detector to deflect said electron beam along one dimension of said target, the said deflection being thereby corrected for angular departure between the echoing object and said central axis, and means to deflect said beam along a second dimension transverse to the first an amount depending upon the time between transmission and reception of a signal, said variable gain amplifier being connected to said storage tube to apply the amplifier output to said voltage responsive means to control the stored signal in accordance with the amplifier output.

8. A simultaneous lobing radar system comprising a transmitter for transmitting signals, two antennas having energy patterns with a central axis for receiving signals echoed from an object, a common scan drive for said antennas, a pair of interconnected transmission lines connected respectively to said antenna, a sum receiver connected to said lines to derive as output a signal proportional to the vector sum of signals from said antennas and a difference receiver connected to said lines to derive as output a signal proportional to the vector difference of signals from said antennas, a phase detector connected to said lines for detecting with sensing the amplitude and phase of the difference signals, a variable gain amplifier connected to amplify said sum receiver output and connected to have the gain of the amplified sum signal controlled by said difference receiver output, a storage tube having cathode means to produce a beam of electrons, a storage target against which said beam of electrons is directed, voltage responsive means to store signals on said target, means to withdraw the difference signal from any point of the target scanned by said beam and deflection means to deflect the beam over said target, means connected to the antenna scan drive and connected to the said phase detector to deflect said electron beam along one dimension of said target, the said deflection being thereby corrected for the angular departure between said echoing object and said central axis, and means to deflect said beam along a second dimension transverse to the first an amount depending upon the time between transmission and reception of a signal, said variable gain amplifier being connected to said storage tube voltage responsive means to control the stored signal in accordance with the amplifier output.

9. A simultaneous lobing radar system having a transmitter for transmitting signals, two antennas having energy patterns with a central axis for receiving signals echoed from an object, a common scan drive for said antennas, two transmission lines coupled by a directional coupler arrangement to transfer one-half the energy at the operating frequency incident from one line into the other with a 90° phase shift, each said line being coupled respectively to one antenna with the electrical length along one of said lines between the effective point of coupling with its respective antenna and that with said directional coupler arrangement being longer by a quarter wavelength at the operating frequency than that along the other lines, a sum receiver connected to one said line to derive as output a signal proportional to the vector sum of signals from said antennas and a difference receiver connected to the other said line to derive as output a signal proportional to the vector difference of signals from said antennas, the combination comprising a phase detector connected to said lines for detecting with sensing the phase and amplitude of the difference signals, a variable gain amplifier connected to amplify said sum receiver output and connected to have the gain of the amplified sum signal controlled by said difference receiver output, a storage tube having cathode means to produce a beam of electrons, a storage target against which said beam of electrons is directed, an electrode to receive signals to be stored, means to withdraw the difference between successive signals from any point of the target scanned by said beam and deflection means to deflect the beam over said target, means connected to said antenna scan drive and connected also to said phase detector to deflect said electron beam along one dimension of said target, the said deflection being thereby corrected for angular departure of the echoing object from said central axis, and means to deflect said beam along a second dimension transverse to the first an amount depending upon the time between transmission and reception of a signal, said variable gain amplifier being connected to said storage tube electrode to control the stored signal in accordance with the amplifier output.

10. The radar system claimed in claim 6, further comprising a lens element mounted to be driven with said antennas, with said antennas substantially at the lens focal point, and the optical axis of said lens substantially in alignment with said axis.

11. A simultaneous lobing radar system comprising a transmitter for transmitting signals, two antennas for receiving signals echoed from an object, a common scan drive for said antennas, a sum receiver connected to said antennas to derive as output a signal proportional to the vector sum of said echoed signals from said antennas, a difference receiver connected to said antennas to derive as output a signal proportional to the vector difference of signals from said antennas, an amplifier connected to receive and amplify said sum receiver output and connected to have the gain of the amplified signal controlled by said difference receiver output, and an indicator circuit distinct and different from said amplifier and connected to receive the gain controlled amplified signal from said amplifier.

12. In a system having two input signals of the same frequency, a first means to derive the vector sum of said signals and a second means to derive the vector difference of said signals, the combination comprising a sum receiver connected to receive said vector sum of said signals and having an output signal proportional to said vector sum, a second receiver connected to receive said vector difference of said signals and having an output signal proportional to said vector difference signal, and a variable gain amplifier connected to receive said sum receiver output signal for amplification thereof and connected to receive said difference receiver output signal for control of the gain of said amplification, and an indicator means distinct and different from said amplifier and connected to receive the gain controlled amplified signal from said amplifier.

13. The system claimed in claim 11, further comprising a signal storage device connected between said amplifier and said indicator circuit.

References Cited by the Examiner

UNITED STATES PATENTS

| | | |
|---|---|---|
| 2,451,005 | 10/1948 | Weimer et al. |
| 2,456,666 | 12/1948 | Agate et al. _____ 343—11 X |
| 2,467,361 | 4/1949 | Blewett _____ 343—11 X |
| 2,512,144 | 6/1950 | Emslie. |
| 2,608,683 | 8/1952 | Blewett _____ 343—11 |
| 2,948,892 | 8/1960 | White. |

FOREIGN PATENTS 604,673    7/1948    Great Britain.

CHESTER L. JUSTUS, *Primary Examiner.*

SIMON YAFFE, NORMAN H. EVANS, *Examiners.*

A. K. GEER, R. E. BERGER, *Assistant Examiners.*